United States Patent [19]

Moon

[11] Patent Number: 4,577,713

[45] Date of Patent: Mar. 25, 1986

[54] AUTOMOTIVE ENGINE OIL DRIP PAN

[76] Inventor: Donald A. Moon, 7000 Brighton Rd., Brighton, Mich. 48116

[21] Appl. No.: 577,957

[22] Filed: Feb. 8, 1984

[51] Int. Cl.[4] .............................................. B62D 25/20
[52] U.S. Cl. .................................. 180/69.1; 184/106; 123/198 E
[58] Field of Search ....................... 180/69.1; 184/106; 123/198 R, 198 E

[56] References Cited

U.S. PATENT DOCUMENTS

| 2,053,297 | 9/1936 | Nittel | 180/69.1 |
|---|---|---|---|
| 2,783,848 | 3/1957 | Beskid | 180/69.1 |
| 3,653,459 | 4/1972 | Andrews | 180/69.1 |
| 3,669,204 | 6/1972 | Andrews | 180/69.1 |
| 3,815,702 | 6/1974 | Paananen | 180/69.1 |
| 4,114,717 | 9/1978 | Andrews | 180/69.1 |

*Primary Examiner*—Stephen F. Husar

*Attorney, Agent, or Firm*—Stephenson & Boller

[57] ABSTRACT

An automotive engine oil drip pan assembly comprises a pan containing a pad which has a preference for absorbing oil over water. The pan is constructed with a depression forming a locator for the pad. The assembly mounts on an automotive engine and powertrain combination with the pan disposed directly below the bell housing area so as to catch and collect oil which may leak through the engine rear bearing and seal. The pad is provided with a recess forming a collection volume for oil which drains through an opening in certain engine and powertrain models. The pan is suspended by means of flexible cords from brackets which are attached to the engine through the use of pre-existing fasteners used to fasten the powertrain's engine. Releasable fasteners are also used to provide for release of the pan assembly for replacement of a used pad.

14 Claims, 11 Drawing Figures

AUTOMOTIVE ENGINE OIL DRIP PAN

This invention relates to an automotive engine oil drip pan for catching and accumulating oil that drips from an automotive engine.

A typical automotive internal combustion engine comprises a power output member for delivering power to the automobile's powertrain. The power output is coupled with the engine crankshaft, and the engine has bearings and seals for journaling of the crankshaft on the engine guarding against leakage of lubricating oil from the engine. The seal and bearing which are adjacent the power output member of the engine are commonly called the rear seal and bearing.

For any of various possible reasons, oil may leak through the bearing and seal with objectionable consequences. For example, oil may leak or drip onto highways, driveways, and garage floors. Not only are such oil stains unsightly, but they can give rise to other undesirable conditions such as contributing to surface slipperiness in wet weather and to environmental pollution when the oil is washed away along with the run-off from rain or melting snow. An especially annoying and potentially damaging consequence of an accumulation of oil occurs when one steps on the oil stain and tracks it into premises such as home or office.

In general, most new automobiles will perform without serious oil leakage or dripping over an initial portion of their useful lives. However, it is probably fair to say that at some point in the useful life of an automobile, it will begin to leak an increasing amount of oil. On an individual basis for an individual automobile owner, a minimal amount of oil leakage is customarily tolerated since there is often a considerable expense involved for the owner to repair the leak. In other words the individual automobile owners are themselves not likely to correct oil leak problems unless they become ones of major proportion. Therefore a certain amount of oil leakage is today an inevitable result of society's use of automobiles. The individual may be unconcerned, but in the aggregate a massive amount of oil has been and will continue to be allowed to leak onto our roadways, driveways, parking lots, etc. with the attendant undesired consequences referred to above.

That leakage of engine oil onto roadways is a significant problem can be seen if one observes a roadway which has been in use for a certain length of time. There is a noticeable dark band between the tire tracks in such lane of travel. Further evidence is in parking lots and garages where cars are parked for periods of time where concentrations of oil often build to the point of being a black sludge-like grease which if stepped upon can ruin shoes and/or be tracked into premises.

The present invention is directed to an automotive engine oil drip pan of novel and unique construction which can totally prevent or at least very substantially minimize oil leakage when put to use. Moreover, the invention is of such a design and construction that it is a cost-effective way for the individual automobile owner to address an engine oil-leak problem, and in this way the invention is a motivation toward promoting a better environment.

Merely having a pan to catch oil is not a satisfactory solution. A pan must be constructed so as to contain the oil which it catches and yet to provide for the convenient periodic disposal of collected oil.

The present invention is directed to an automotive engine oil drip pan assembly which admirably meets these objectives.

One advantage of the present invention is that it comprises an oil drip pan provided with an oil absorbant pad which is a medium of a character effective to absorb oil but not water.

A problem with the absorption of oil by certain media is that such media are also water-absorbent. Due to the diverse physical characteristics of oil and water, such media have a preference for absorbing water, and therefore when wetted with water will tend to release any oil which may have been previously absorbed. With the present invention, the oil absorbent medium in the pan has a preference for oil over water and hence is effective to contain leaked oil without being affected in any substantial way by water.

Water, of course, is a prevalent environmental condition in the vicinity of the undercarriage of the automobile due to road-splash from rain and snow. Because of its oil absorbent preference, the present invention can be of a design which does not have to provide a watertight enclosure, and this yields important benefits.

For one, the pan can be fabricated to a shape which will be suitable for use with many engine-powertrain configurations. For another, it is adapted for convenient installation, yet when the need to replace the absorbent medium occurs, the pan can be readily released to provide for the convenient replacement. The design also does not have to decrease the road clearance of the vehicle, and it can be positioned in a somewhat protected area so as to be less susceptible to stone damage. The positioning and design can avoid the creation of any significant aerodynamic drag because of use of the invention.

Still another feature of the invention is that as noted earlier it is adapted for economical fabrication so that it can be sold at a retail price which will be cost-effective insofar as consumers are concerned.

The invention presents the opportunity for the solution of a major problem associated with automotive usage but which has not been recognized as such.

The invention is also endowed with further features by virtue of the specific construction to be described herein.

The foregoing features, advantages and benefits of the invention, along with additional ones, will be seen in the ensuing description and claims which should be considered in conjunction with the accompanying drawings. The drawings disclose a preferred embodiment of the invention according to the best mode contemplated at the present time in carrying out the invention.

DESCRIPTION OF THE PREFERRED EMBODIMENT

Figure 1:
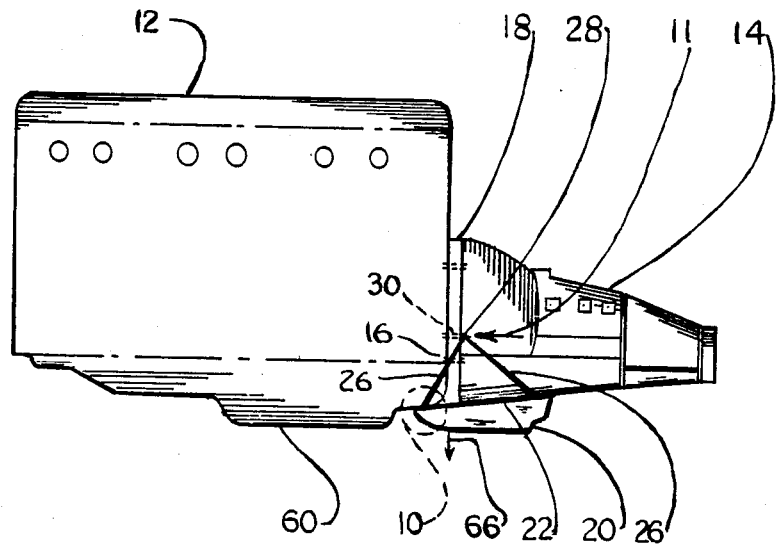
FIG. 1 is a side elevational view illustrating an automotive engine and powertrain to which the oil drip pan assembly of the present invention has been applied.

FIG. 1 illustrates a typical automobile engine 12 and powertrain 14. It will be appreciated that the illustration is intended to be representative and that principles of the invention can be applied to other forms of engines and powertrain combinations. The reference numeral 16 designates generally the rear bearing and seal area of the engine. The powertrain in the case of an automatic transmission may comprise a torque converter which mounts on the engine and to which the engine output is operatively coupled. In the case of a manual transmission, the powertrain comprises the clutch mounting to the engine followed by the manual transmission.

The illustrated construction comprises what may be considered in general as a bell housing or flywheel cover 18 which is disposed over the rear end of the engine with an operative coupling being provided from the engine power output to the particular mechanism involved for the two types of transmissions. The power output of the engine typically comprises a flywheel enclosed by the bell housing.

In accordance with principles of the invention, an oil drip pan assembly 20 is disposed beneath the engine and powertrain combination in the area of the rear bearing and seal 16 below bell housing 18. Assembly 20 comprises an open-top pan 22, shown by itself in FIGS. 3 through 7 and an oil absorbent pad 24 shown by itself in FIGS. 8 and 9.

Figure 11:
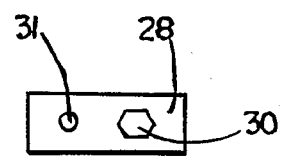
FIG. 11 is an enlarged view taken in the direction of arrow 11 in FIG. 1.

Assembly 20 is secured on the engine and powertrain combination by means of suspension elements 26 at opposite sides. FIG. 1 illustrates one of the elements 26 at one side, and it will be appreciated that there is a corresponding suspension element on the opposite side. A very suitable and effective suspension element is a thin plastic cord which possesses certain attributes hereinafter explained. As can be appreciated from consideration of FIG. 1 element 26 passes through a hole in a bracket 28 attached to the engine and powertrain combination, and the ends of the element connect to fore and aft spaced apart locations on pan 22. FIG. 11 shows further detail of bracket 28 which is installed by removing one of the existing bolts 30, placing the bracket over the hole from which bolt 30 was removed, passing the bolt back through a clearance hole in the bracket and re-tightening the bolt to secure the bracket in place. The bracket has a second hole 31 through which element 26 passes.

Figure 3:
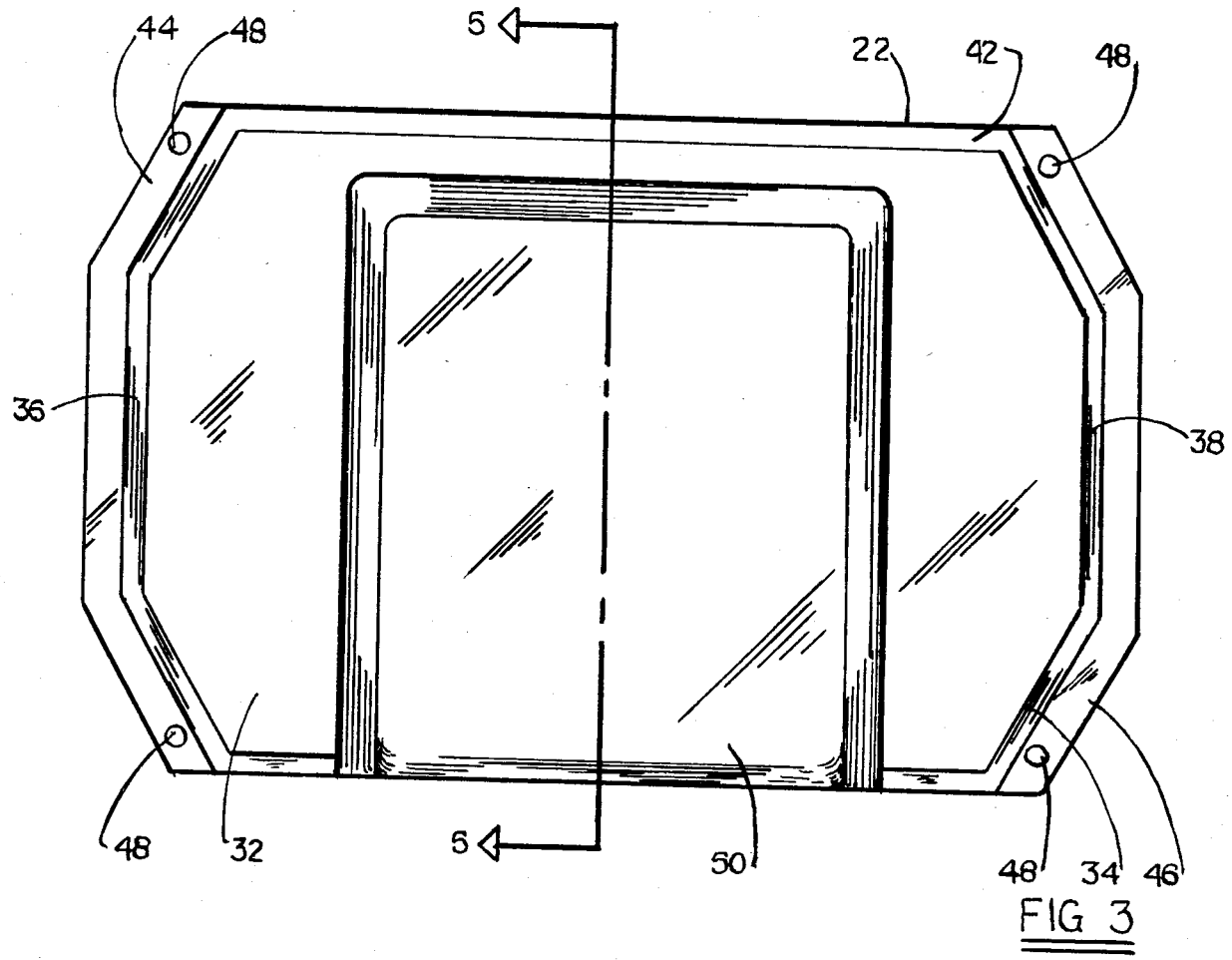
FIG. 3 is a bottom view of the oil drip pan of FIG. 2 by itself.
Figure 4:
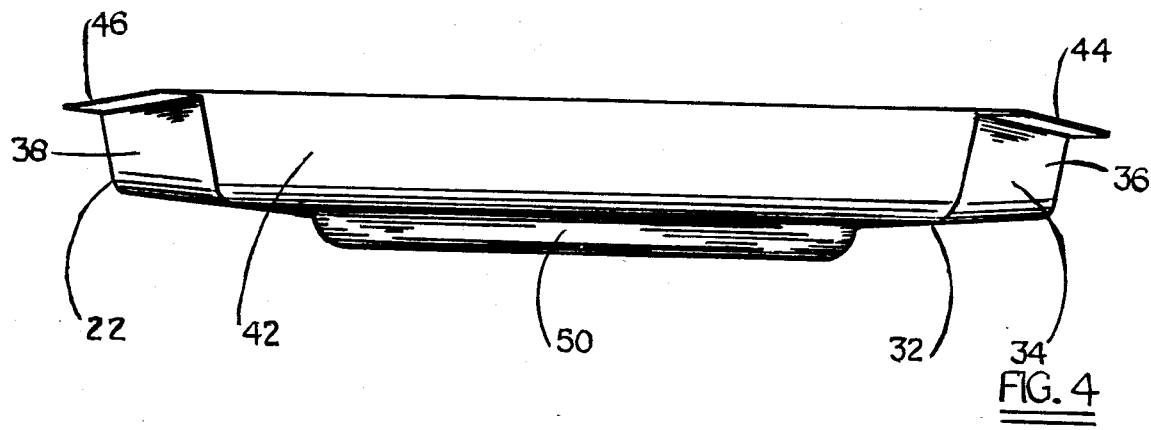
FIG. 4 is a rear elevational view of the oil drip pan.

Referring now to FIGS. 3 through 7 a description of details of pan 22 will be given. Pan 22 comprises an imperforate bottom wall 32 and a continuous upstanding sidewall 34 so as to provide an open-top pan. While the pan may be considered of a generally rectangular overall shape, it does, however, have lateral sidewall portions 36 and 38 respectively which as can be seen in FIG. 3 are not straight in plan but rather have laterally outward offsets. The front and rear sidewall portions 40 and 42 are generally straight.

The top upper edge of each of the sidewalls 36, 38 is provided with a corresponding outwardly directed flange 44 and 46 respectively. Apertures 48 are provided in the flanges, two in each flange whereby the four apertures are in a generally rectangular pattern. These apertures are used in association with the suspension elements 26 for securing the pan on the engine and powertrain combination.

The bottom wall of the pan comprises a depression 50 which is of generally rectangular shape in plan. Depression 50 extends rearwardly from the front sidewall portion 40 but stops short of the rear sidewall portion 42. Depression 50 defines a locator for pad 24.

Figure 8:
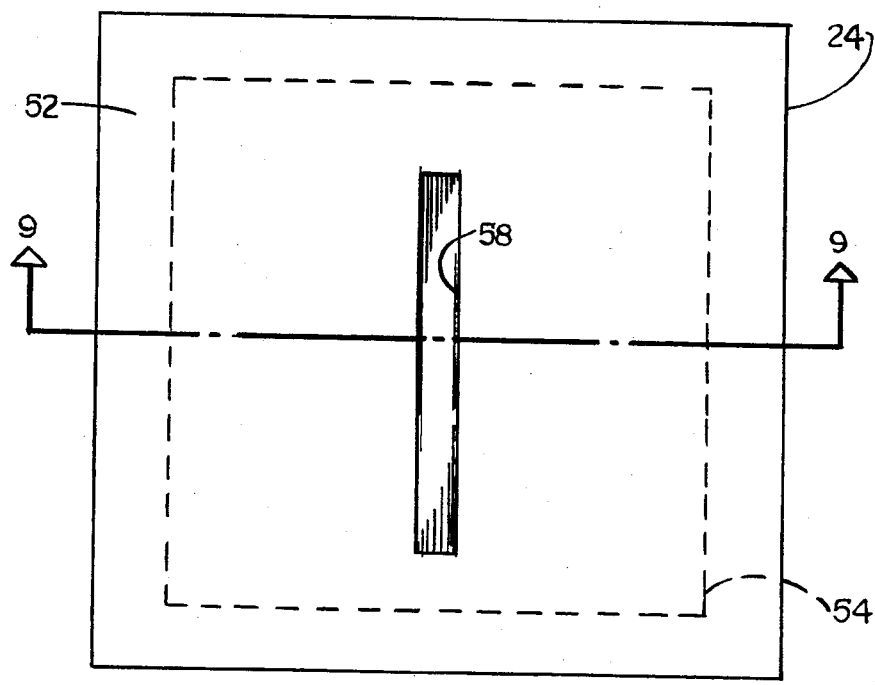
FIG. 8 is a top plan view of the absorbent pad of the assembly, shown by itself.
Figure 9:
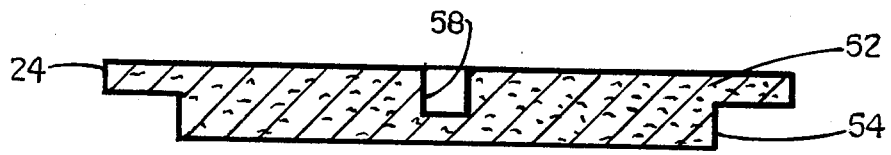
FIG. 9 is a sectional view taken in the direction of arrows 9—9 in FIG. 8.

Referring now to FIGS. 8 and 9, the detailed construction of pad 24 will be given. The pad has a generally rectangular shape in plan. The overall rectangular shape in the top plan view includes a flange 52 extending around the outside of a main body portion 54 at the top. The main body portion 54 fits within depression 50 of pan 22.

Figure 2:
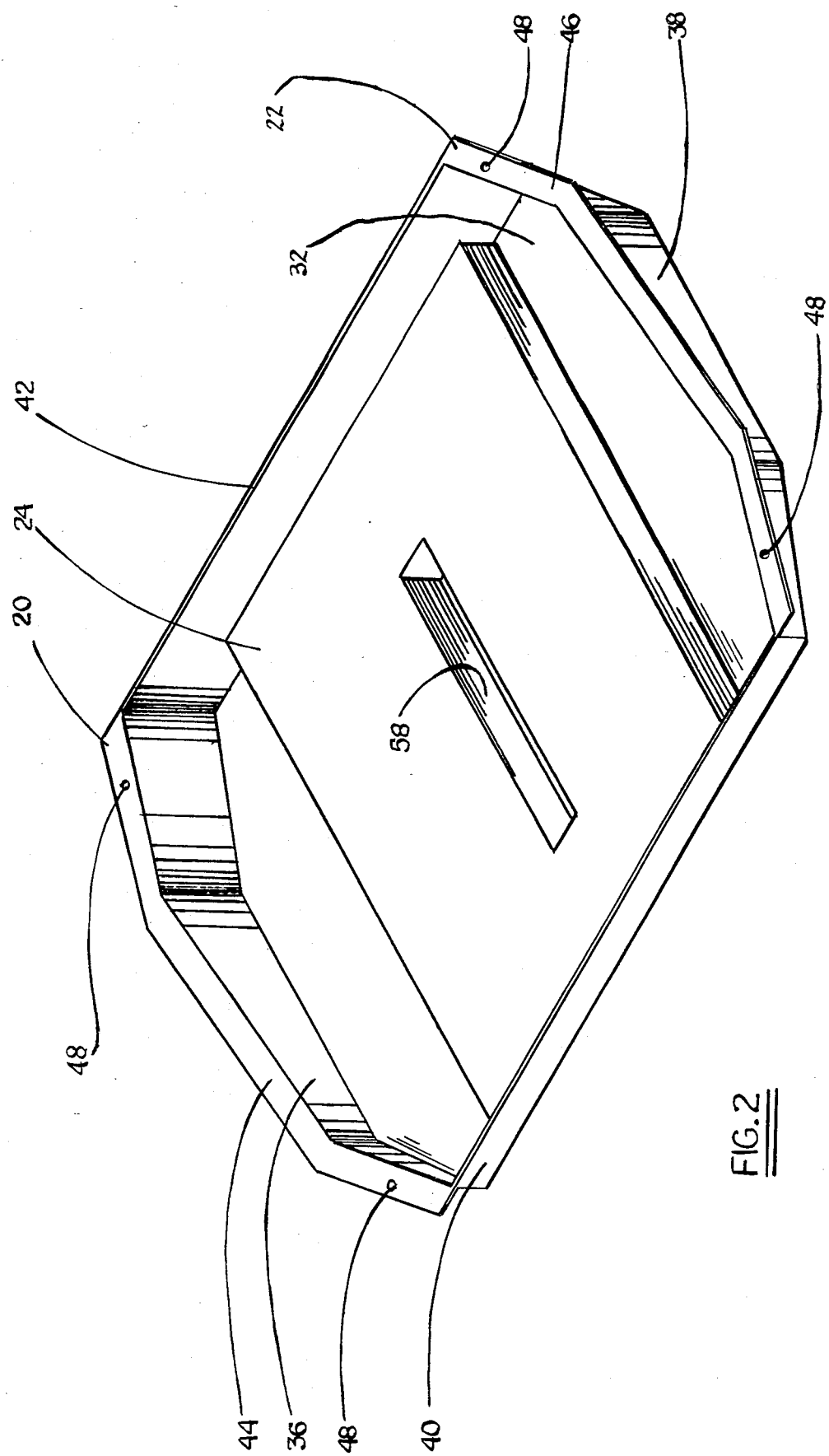
FIG. 2 is an isometric view of the oil drip pan assembly of FIG. 1 shown by itself but on an enlarged scale.

FIG. 2 illustrates the installed position of the pad in the pan. In the installed position, the top forward edge of the pad is essentially flush with the top edge of of the side front wall portion 40. The top rear edge of the pad is spaced below the upper edge of the rear sidewall portion 42. With this construction, the top surface of the pad is parallel with the bottom wall of the pan, and when the assembly is installed on the engine and powertrain combination they are both horizontal.

It will be further observed that pad 22 is provided with a laterally central slot 58 which has a limited longitudinal fore and aft extent. Slot 58 has a rectangular shape in cross section and is intended to serve a particular purpose when the pan and pad assembly is mounted on the engine and powertrain combination. Slot 58 is to provide a collector volume for certain leakage while guarding against the possibility of the pad blocking a leakage path which is deliberately provided in certain models of engine and powertrain combinations for the purpose of allowing leakage oil to drain out. In certain instances the placement of a pad directly against the drain might create an obstruction which would impair the desired draining of oil. The provision of slot 58 guards against this possibility.

Figure 5:
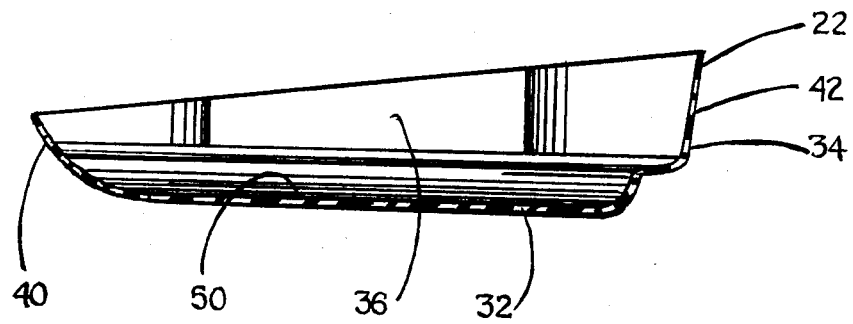
FIG. 5 is a sectional view taken in the direction of arrows 5—5 in FIG. 3.
Figure 6:
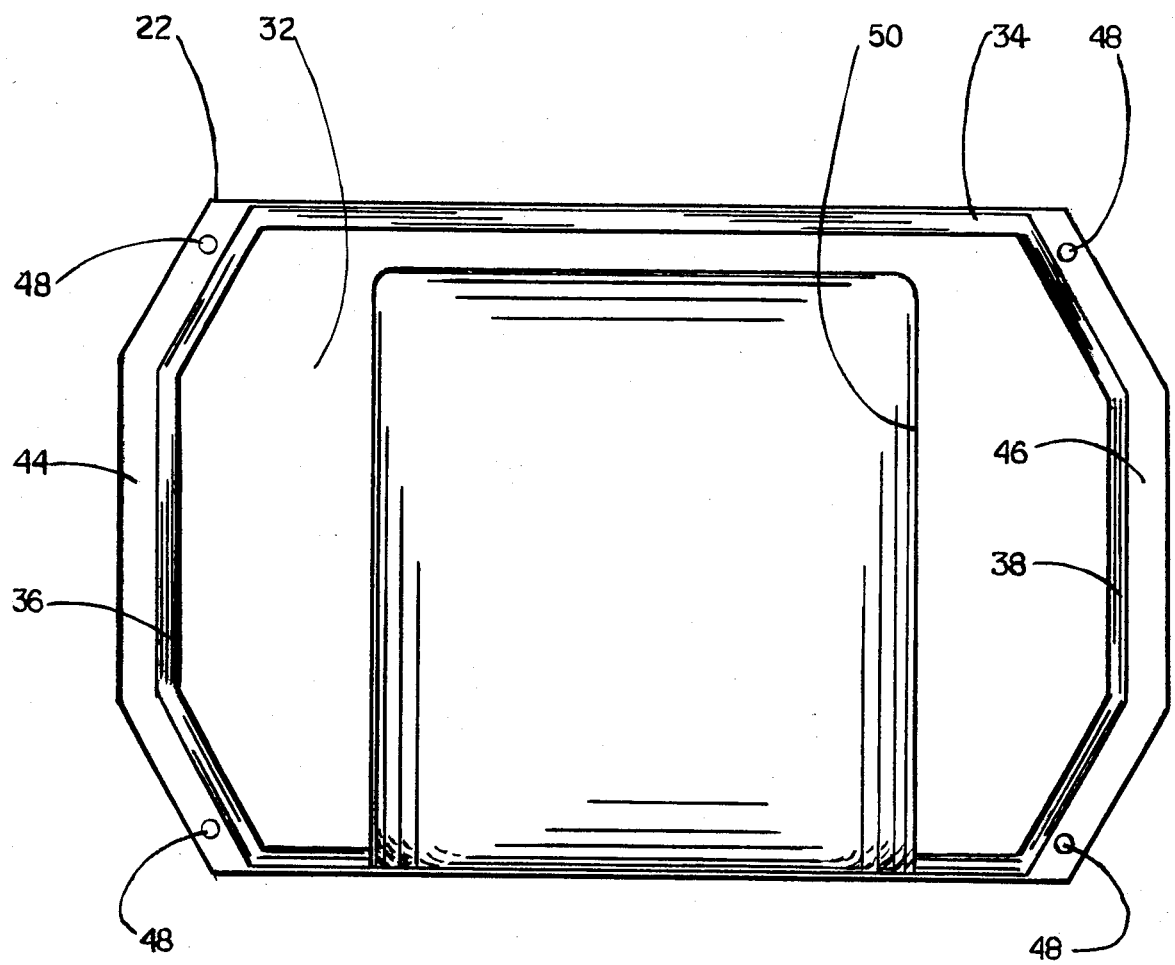
FIG. 6 is a top plan view of the oil drip pan.

As can be seen from consideration of FIGS. 1 and 5, sidewall 34 of pan 22 has a height which progressively increases from front to rear (i.e. fore and aft). The shape has a uniform taper and therefore flanges 44, 46 lie in a plane which is inclined relative to the bottom wall 32 of the pan. The top edge of front wall portion 40 lies in this plane as well as the top edge of rear sidewall portion 42. This construction provides for a certain conformance with the engine and powertrain when assembly 20 is installed as illustrated in FIG. 1. The pan is relatively shallow in comparison to its length and width. It is disposed in what may be deemed a protected area behind the engine oil pan 60 attached to the bottom of engine 12. In this position of mounting, assembly 20 does not give rise to any significant aerodynamic drag when the vehicle is moving.

From consideration of the description and the drawing figures thus far, it can be seen that the pan and pad assembly is positioned to catch and collect oil which may leak from the rear bearing and seal area. Importantly the medium which forms pad 24 is a material which has a characteristic absorption preference for oil over water. This characteristic promotes the oil containment capability of the assembly of the invention but without complicating its design and installation.

It will be noted that the construction of the pan is not complicated and that it can be fabricated by conventional manufacturing techniques, such as metal forming in the case of a metal pan or plastic fabrication in the case of a plastic pan. The preferred construction material for the pan is one which is sufficiently tough to retain its shape, resist stone damage and the like, withstand moisture, salt and the expected hot and cold temperature extremes of outside weather and engine heat, and not deteriorate from the oil which it collects and retains. Examples of suitable media for the pad include "3M Brand Static Resistant Oil Sorbent". This material has the advantage of absorbing from 13 to 25 times its own weight, soaking up organic liquids rapidly while repelling water, and strength retention when wet. It is a synthetic micro-fiber material which can be fabricated to the illustrated shape or to other shapes as desired.

Another oil sorbent is "Imbiber Beads" manufactured by Emco, Inc. The "Imbiber Beads" are individual spheres and when used in the present invention are contained in any suitable manner to give the pad the desired shape.

Other equivalent products may also be used, but at the present time these are the two preferred media for the pad.

The invention also has the advantageous feature of being readily serviceable whenever replacement of pad 24 is appropriate. Pad 24 can effectively absorb a certain amount of oil. Any excess beyond the capacity of the pad will not be absorbed. Therefore, replacement of the pad at periodic intervals will often be appropriate.

Figure 10:
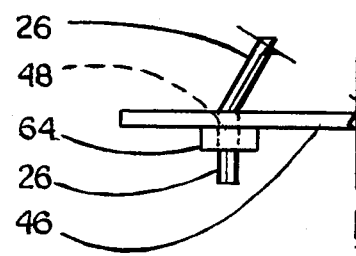
FIG. 10 is a perspective view on an enlarged scale taken in circle 10 of FIG. 1.
Figure 7:
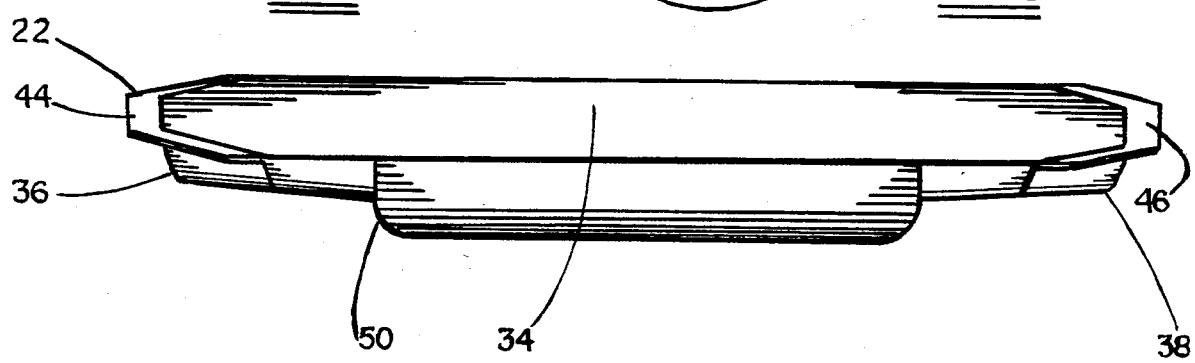
FIG. 7 is a front elevational view of the oil drip pan.

Replacement may be done in the following manner. A removable fastener 64 (see FIG. 10) may be used on one end of each of the two suspension elements 26 for instance at the forward holes 48. Fastener 64 is removed from the end of each element 26, and this allows the pan to be released so that convenient access can be had to the pad via the open top of the pan. The pan may be dropped downwardly and/or swung in a particular manner such as indicated by the arrow 66. At this time any other accumulated contents within the pan may also be removed.

After a new pad has been installed, the pan is repositioned snugly against the engine and powertrain combination, and each fastener 64 is reinstalled on the end of the elements 26 so that the elements 26 are taut. The described construction both renders the replacement procedure convenient and also provides a relatively simple yet secure mounting of the pan on the engine and powertrain combination.

Although the foregoing description makes reference to one particular installation, it will be appreciated that principles of the invention have broad application. For example, the term automobile includes automobiles, trucks, and other types of vehicles. The vehicles may be front-wheel drive, rear-wheel drive or four-wheel drive, and the mounting of the engine-powertrain combinations in the vehicle may be fore and aft or transverse.

A particularly convenient embodiment of the invention comprises the commercial offering of same in a kit form containing a pan, one or more pads, a length or lengths of plastic cord for elements 26 sufficiently long to enable the pan to be mounted on a range of vehicles, a pair of brackets 28 and a pair of releasable fasteners 64. At installation the plastic cord may be cut to the appropriate length for each element. Nylon is a suitable plastic for the cord. While it is certainly possible to use releasable fasteners at both ends of each suspension element 26, one end can be secured by any suitable means regardless of whether it is releasable or not.

While a preferred embodiment of the invention has been disclosed, it will be appreciated that principles are applicable to other embodiments.

What is claimed is:

1. In combination with an oil lubricated automotive vehicle engine and powertrain combination wherein the engine has a power output coupled to the powertrain so that power from the engine can be delivered through the powertrain for propelling the vehicle, said engine having a bearing and seal adjacent the operative coupling of its power output with the powertrain, the improvement which comprises means to collect oil which leaks through the bearing and seal comprising an open-top pan disposed in association with the engine and powertrain to catch oil leaking from the bearing and seal, an oil absorbent medium disposed in said pan for absorbing oil, said medium having a preference for absorption of oil over water, and means for releasably mounting said pan on the engine and powertrain combination so as to secure the pan on the engine and powertrain combination during use and to permit the pan to be released to a position for replacement of the oil absorbent medium during service in which the engine has an oil pan at the bottom of the engine and wherein said open-top pan is disposed above and behind the bottommost portion of the engine oil pan such that said open-top pan does not decrease the road clearance of the vehicle nor extend forwardly of the bottommost portion of the engine oil pan.

2. The improvement set forth in claim 1 in which said open-top pan has a bottom wall which is disposed generally horizontally when secured on the engine and powertrain and an upwardly extending sidewall extending upwardly from said bottom wall, said sidewall having lateral sidewall portions extending fore and aft on laterally opposite sides of the pan, said sidewall portions, when viewed laterally, having upper edges disposed in a plane which is non-parallel to the plane of the bottom wall of the pan such that the height of the lateral sidewall portions increases in the direction from the engine to the powertrain.

3. The improvement set forth in claim 1 in which said oil absorbent medium comprises a depression in its top surface defining a collector volume, and said depression is disposed directly below a drain in the engine and powertrain combination.

4. The improvement set forth in claim 1 in which said means for releasably mounting said open-top pan on the engine and powertrain combination comprises separate suspension elements on laterally opposite sides, each having fore and aft points of connection to the open-top pan and each suspension element having a point of connection to the engine and powertrain combination intermediate its points of connection to said open-top pan.

5. The improvement set forth in claim 4 in which at least one of said suspension elements comprises a flexible cord having fore and aft points of connection to said pan.

6. The improvement set forth in claim 5 in which said flexible cord passes through an opening in a bracket which is attached to the engine and powertrain combination.

7. The improvement set forth in claim 6 including a releasable fastener for releasably securing the flexible cord with respect to said pan.

8. The improvement set forth in claim 6 in which said bracket is attached to the engine and powertrain combination by the use of a pre-existing fastener used to fasten the powertrain and engine.

9. The improvement set forth in claim 1 including a depression formed in said bottom wall as a locator for said medium and in which said medium is configured to a shape to fit within said recess and be located by said recess in a desired position of installation.

10. The improvement set forth in claim 1 in which said means for releasably securing the open-top pan on the engine and powertrain combination comprises a suspension from the combination having fore and aft points of connection with the open-top pan at least one of which is releasable to provide access to the open-top pan for replacement of the oil absorbent medium, and with the suspension having an intermediate point of connection to the combination.

11. An automotive engine oil drip pan assembly comprising an open-top pan having a bottom wall and a sidewall extending upwardly from said bottom wall, a depression in said bottom wall, a pad disposed in said pan comprising an oil absorbent medium having an absorption characteristic with a preference for absorption of oil over water, said pad having a main body portion fitting within said depression and of such a configuration as to be located in a desired position of installation in said pan by virtue of its fit within said depression and in which said pad has a top surface and including a depression formed in said top surface to extend into said main body portion and form a volume for collection of oil and said pad having a flange portion extending around said main body portion adjacent said top surface and outwardly of said main body portion so as to overlap a marginal portion of said bottom wall bounding said depression in said bottom wall.

12. An assembly as set forth in claim 11 in which said depression in said pad comprises an elongate slot in said top surface having longitudinal ends stopping short of the edges of said top surface.

13. In combination with an oil drip pan for an automotive vehicle engine and powertrain combination including a bell housing at the junction of the engine and powertrain combination, a suspension system for suspending the oil drip pan on the engine and powertrain combination comprising brackets for attachment by means of pre-existing fasteners used to secure the powertrain and engine at the bell housing for catching oil which leaks through the rear main bearing of the engine, and flexible elongated suspension elements for suspending the pan such that each suspension element extends from a point of connection with the pan through an aperture in one of the brackets and to another point of connection with the pan, and wherein the oil drip pan does not extend below the bottommost portion of the engine so as not to decrease the road clearance of the vehicle.

14. An oil absorbent pad for use in conjunction with a drip pan for an automotive engine and powertrain combination, said pad comprising a medium which has an absorption preference for oil over water, said pad comprising a main body of given shape and including a flange extending around and outwardly of a portion of said main body and a depression in one surface of said main body of said pad which is intended to be disposed in confrontation of the engine and powertrain combination to define a collector volume for oil below a drain in the combination.

* * * * *